United States Patent [19]

Yokoyama

[11] Patent Number: 5,646,691
[45] Date of Patent: Jul. 8, 1997

[54] SYSTEM AND METHOD FOR INTER-FRAME PREDICTION OF PICTURE BY VECTOR-INTERPOLATORY MOTION-COMPENSATION BASED ON MOTION VECTORS DETERMINED AT REPRESENTATIVE POINTS CORRECTABLE IN POSITION FOR ADAPTATION TO IMAGE CONTOURS

[75] Inventor: Yutaka Yokoyama, Tokyo, Japan

[73] Assignee: NEC Corporation, Japan

[21] Appl. No.: 590,490

[22] Filed: Jan. 24, 1996

[30] Foreign Application Priority Data

Jan. 24, 1995 [JP] Japan ..................... 7-008792

[51] Int. Cl.⁶ ..................................... H04N 7/36
[52] U.S. Cl. ................. 348/416; 348/26; 348/415; 348/699; 382/107; 382/197; 382/199
[58] Field of Search ..................... 348/416, 699, 348/700, 701, 399, 400, 401, 402, 409, 411, 412, 413, 415; 382/107, 199, 236

[56] References Cited

U.S. PATENT DOCUMENTS

| | | | |
|---|---|---|---|
| 5,093,869 | 3/1992 | Alves et al. | 382/22 |
| 5,103,488 | 4/1992 | Gemello et al. | 382/22 |
| 5,226,093 | 7/1993 | Iwase | 382/41 |
| 5,305,400 | 4/1994 | Butera | 382/56 |
| 5,317,397 | 5/1994 | Odaka et al. | 348/416 |
| 5,379,350 | 1/1995 | Shimazu et al. | 382/22 |
| 5,416,855 | 5/1995 | Geiger | 382/254 |
| 5,467,136 | 11/1995 | Odaka et al. | 348/416 |
| 5,473,378 | 12/1995 | Tamitani | 348/416 |
| 5,500,904 | 3/1996 | Markandey et al. | 382/103 |
| 5,512,962 | 4/1996 | Homma | 348/699 |

OTHER PUBLICATIONS

K. Kitayama et al., "Contour Fitting Motion Compensation", Proceedings of the Spring Term Meeting of the Institute of Electronics, Information and Communications Engineers of Japan, D-295, 1993, pp. 7–56.

Primary Examiner—Howard W. Britton
Assistant Examiner—Frank Snow
Attorney, Agent, or Firm—Ostrolenk, Faber, Gerb & Soffen, LLP

[57] ABSTRACT

Representative points vicinal to a detected contour line of an image-segmented input picture are corrected in position so that lattice links connecting the representative points extend along the detected contour line, and motion vectors are detected at the corrected representative points, before a motion vector at each pixel in the picture is interpolated from the detected motion vectors at representative points near thereto, for a motion-compensated inter-frame prediction small of a deformed distortion.

9 Claims, 12 Drawing Sheets

```
              3
            3 2 3
          3 2 1 2 3
        3 2 1 0 1 2 3
          3 2 1 2 3
            3 2 3
              3
```

```
   √8 √5 2 √5 √8
   √5 √2 1 √2 √5
    2  1  0  1  2
   √5 √2 1 √2 √5
   √8 √5 2 √5 √8
```

```
3 3 3 3 3 3 3
3 2 2 2 2 2 3
3 2 1 1 1 2 3
3 2 1 0 1 2 3
3 2 1 1 1 2 3
3 2 2 2 2 2 3
3 3 3 3 3 3 3
```

```
      3 3 3
    3 2 2 2 3
  3 2 2 1 2 2 3
  3 2 1 0 1 2 3
  3 2 2 1 2 2 3
    3 2 2 2 3
      3 3 3
```

CONCERNED REPRESENTATIVE POINT

● : NEIGHBORING REPRESENTATIVE POINT

▭ : PIXELS IN ▭ CONSTITUTE A SEGMENT BOUNDARY CONNECTING TO CONCERNED REPRESENTATIVE POINT

ON PICTURE OF PREVIOUS FRAME    ON PICTURE OF CURRENT FRAME

SYSTEM AND METHOD FOR INTER-FRAME PREDICTION OF PICTURE BY VECTOR-INTERPOLATORY MOTION-COMPENSATION BASED ON MOTION VECTORS DETERMINED AT REPRESENTATIVE POINTS CORRECTABLE IN POSITION FOR ADAPTATION TO IMAGE CONTOURS

BACKGROUND OF THE INVENTION

The present invention generally relates to a system and a method for a motion-compensated inter-frame prediction in a coding of a motion picture (hereafter "picture"), and particularly, to a system and a method for a motion-compensated inter-frame prediction to be performed in a coding of a picture by an interpolatory motion compensation, in which respective motion vectors at a total number of pixels in the picture are interpolated from a set of motion vectors each respectively determined at a corresponding one of a predetermined number of so-called "representative points" that have their positions in the picture individually correctable for an adaptation to a detectable contour of a picked-up image of a moving object, i.e. of an image moving or moved from a position thereof in a previous frame of time (hereafter "moved image").

DESCRIPTION OF THE RELATED ART

Recent years have observed various systems and methods employable for coding a set of data on a picture into a sequence of codes.

Some of them are implemented for processing, in a prediction stage of a coding, a set of input data representing a picture (hereafter "input picture") in a current frame of time and a set of available data representing a picture (hereafter "reference picture") representative of a picture in a previous frame of time, by applying an improved motion compensation to a respective one of pixels of the reference picture, to provide a set of predicted data representing a picture (hereafter "predicted picture" or "prediction picture") representative of the input picture, before entering subsequent stages of the coding including a subtraction stage for generating a set of differential data representative of a difference between the predicted picture and the reference picture and a conversion stage for converting the set of differential data into a sequence of codes.

The improved motion compensation for each pixel is effected by using a motion vector interpolated for the pixel from associated ones of a set of motion vectors each respectively determined, as an adequate one of varieties of computable directional relative norm distances (a euclidean distance inclusive), between a minute local region represented by a calculated position in the reference picture and a corresponding minute local region of the input picture, as the corresponding local region is represented by a corresponding one of a predetermined number of representative points which have their positions variable for a correction from their initial setting so that they are interconnectable to define a set of corrected segment regions or warped patches covering an entirety of the input picture, in a devised manner for an adaptation to detectable contour lines of any moved image in the input picture.

For example, there has been proposed in a paper "Contour Fitting Motion Compensation" by K. Kitsyams et al., the Proceedings of the Spring Term Meeting in 1993 of the Institute of Electronics, Information and Communications Engineers of Japan, D-295, p. 7–56 a method for a motion-compensated inter-frame prediction to be performed by correcting positions of representative points in an adaptive manner to a contour of a picked-up image of a moving object.

In a simplified local model of this conventional method, a contour line of a moved image is detected from data on an inter-frame difference, and is employed to correct a position of a neighboring representative point so that this point is located on the contour line.

For such a positional correction to be achieved over an entire region of a picture, there is assumed in the conventional method a field of potential energy varying in dependence on a distance from a nearest contour line, as this method is applicable within a distance range not exceeding the threshold value.

Namely, there is assumed a valley-like potential surface running along each contour line, as the remaining potential surfaces extend like tablelands at a height of the threshold value. Therefore, any representative point as a mass located on a slope of a valley-like surface has a tendency to slide down at right angles to an associated contour line. The valley-like surface has an even bottom level.

Further, an arbitrary pair of representative points are assumed to be resiliently linked to each other. Accordingly, there is assumed an elastic net of which cross points are each constituted with a representative point as the mass. As the net rests on the potential field, with peripheral sides all fixed, some part of the net yields down along a valley-like surface, so that associated representative points tend to slide down, but the tendency is reduced due to resilient forces of connected links.

In this respect, in the conventional method, a total sum of potential energy and resilient energy of the representative points is calculated, and stepwise reduced to approach a minimized state by causing each representative point to move in a sense in which a resultant force due to the energy acts thereon and by a distance corresponding to a magnitude of the resultant force.

The energy reduction step is repeated a predetermined number of times so that some representative points may be left off from any contour lines, or until it reaches the minimized state in which any representative point in any valley-like surface of the potential field is located on a contour line.

A resultant allocation of the representative points allows a set of connection lines between respective pairs of neighboring or diagonally opposing ones of the points to define a set of segment regions adapted to a certain degree to a pattern of contour lines of moved images, thus permitting an improved prediction performance.

The conventional method however has drawbacks, as will be discussed below.

FIG. 1 is a block diagram of an exemplary system for a motion-compensated inter-frame prediction to be performed substantially in accordance with the conventional method described, in combination with other known techniques and additional conjectures, as the system is partially employed in later-described embodiments of the present invention. An initial uniform state of an associated segmentation of a picture frame is illustrated in a left upper part of FIG. 3 and FIG. 6A, and a corrected state thereof is illustrated in a right upper part of FIG. 3.

The system of FIG. 1 comprises a setting means for setting an initial allocation of representative points, a detection means 102 for detecting contour lines of an input picture PI, another setting means 110 for setting a potential field depending on the contour lines, an evaluating means 105 for evaluating a fitness of each representative point to the potential field, another evaluating means 111 for evaluating a relative relationship between locations of representative points in terms of resilient energy, a correcting means 106 for correcting the location of each representative point, another detecting means 107 for comparing the input picture PI with a reference picture PR to detect by computation a motion vector at each corrected representative point, and a predicting means 108 for performing an interpolatory motion compensation of the reference picture PR to provide a set of data D160 representing a prediction picture.

The initial representative point allocation setting means 101 outputs a set of data D151 on initial locations of the representative points, via a change-over switch 153, and a set of data D152 on connections between the representative points, directly to the representative point location relative relationship evaluating means 111, the motion vector detecting means 107 and the motion-compensated picture predicting means 108.

The contour detecting means 102 receives the input picture PI, and outputs a set of data D154 representative of the contour lines to the potential field setting means 110, which means 110 outputs a set of data D162 on the potential field to the fitness evaluating means 105, which outputs a set of data D157 on an evaluated fitness of each representative point to the representative point location correcting means 106.

The location correcting means 106 outputs a set of data D158 on corrected locations of the representative points to the motion vector detecting means 107, the motion-compensated picture predicting means 108 and the change-over switch 153, which switch 153 is controlled in a later-described manner for selecting the representative point location data D151 or D158 to input the selected data D153 (=D151 or D158) to the fitness evaluating means 105 and the relative relationship evaluating means 111, which means 111 outputs a set of data D168 on evaluated relative relationships between locations of the representative points.

The initial allocation setting means 101 serves for setting up a set of data D101 representing an initial uniform state (See the left upper part of FIG. 3) of segmentation of an imaginary rectangular picture frame PF (See FIG. 6A) in which any picture is mapped as it is, whenever it is processed in the system.

In the initial state (See FIG. 6A), the picture frame PF is divided into an (S−1)×(T−1) matrix of square regions defined by a lattice of S row lines×T column lines, where S and T are predetermined positive integers, respectively, and each square region is sub-divided into a pair of triangular regions. Namely, the picture frame is segmented into a total of 2(S−1)×(T−1) uniform triangular segments.

In a later-described corrected state (See the right upper part of FIG. 3), the triangular segments are deformed or warped.

In either state, however, any and all segments are representable by a combination of information on positions of and information on interconnections among a total of S×T representative points R (See the left upper part of FIG. 3) that may be each identified by an identifier (s, t) of a lattice point on which it rests in the initial state, where s and t are arbitrary positive integers representing a row-line identification number and a column-line identification number of the lattice point (s, t) such that $1 \leq S$ and $s \leq t \leq T$, respectively.

Accordingly, the set-up data D101, which represent a uniform initial allocation of the S×T representative points R(s, t), comprise the initial representative point location data D151 which include representative point identifying information (hereafter collectively "R-ID"), and the representative point connection data D152 which also include R-ID.

On the other hand, the input picture PI is analyzed at the contour detecting means 102 for detecting contours of moved images in the picture PI to output the contour line representative data D154.

The picture PI is input as a picture of a current frame (hereafter sometimes "current picture") to the contour detecting means 102, which has stored therein a set of data on a picture of a previous frame, i.e. an input picture in the previous frame (hereafter sometimes "previous picture").

As any picture data comprises a valued image data at a corresponding pixel of which a location in the picture frame PF is always fixed, the set of data on the previous picture is elementwise subtracted from the set of data on the current picture, to obtain an inter-frame difference picture substantially representing moved images, as they have contrastive margins to a still background (See FIG. 5).

Such margins are each composed of one or more substantially straight segment lines, which segment lines are deemed as contour lines of the moved images. Since these lines are each constituted with an array of pixels, respective coordinates or addresses of such pixels may be output together with one of two defined values (e.g. "0" for any contour and "1" for any background), as the contour line representative data D154 from the contour detecting means 102.

The data D154 are then input to the potential field setting means 110, where they are processed to generate the data D162 representing the potential field of which an energy level or potential U(x, y) at any pixel (x, y) in the picture frame PF depends on a distance from a nearest contour line.

The potential field representative data D162 are input to the fitness evaluating means 105, which holds the data D162 until a flow in a programmed routine for repeating a positional correction of representative points goes to an end, with a correction cycle repeated a preset number of times or with a correction complete signal given, or until the current data D162 are updated by data D162 of a subsequent picture.

In this concern, letting CC be a correction cycle count number to be incremented, the switch 153 is controlled in dependence on the count number CC so that the initial representative point location data D151 from the means 101 are selected as the data D153 if and only when the number CC is reset to zero, and the corrected representative point location data D158 (including R-ID) from the means 106 are selected as the data D153 unless CC is zero.

In either case, the data D153 represent locations (x, y) of identified representative points R(s, t) in a current cycle ($0 \leq CC < CC_{max}$ [preset value]). The location data D153 are input to the fitness evaluating means 105, which means 105 reads a potential U(x, y) at each location (x, y) represented by the data D153 to output the potential (together with R-ID), as an evaluated fitness of a corresponding point R(s, t) to a nearest contour line, i.e. as the fitness data D157.

The location data D153 are input also to the relative relationship evaluating means 111, where they are processed by using a set of data D111 representing a spring constant of an elastic link between representative points and a natural length that the elastic link has without external forces acting on associated representative points, to calculate resilient energy between representative points R(s, t) and R(s′, t′), which energy is output (in combination with the connection data D152 including R-ID) as the evaluated relative relationship data D163. In the data D111, the spring constant is stored in the evaluating means 111, but the natural length of link is based on the initial data D151 informed to the evaluating means 111 when the cycle count number CC=0.

The resilient energy between any pair of representative points R(s, t) and R(s', t') consists of an integration of elastic strain energy along a link therebetween and equally acts on the points R(s, t) and R(s', t') as a resilient bias depending on a difference between a current length and the natural length of the link, i.e. as an active and binding force in a bias direction.

The potential energy data D157 from the evaluating means 105 and the resilient energy data D163 from the evaluating means 111 are both input to the location correcting means 106, where they are processed to calculate a resultant force acting on each representative point R(s, t), which force is employed for solving a motion equation of the point (as a mass) to determine a distance by which the point should travel in an acting direction of the resultant force in a unit time.

Each representative point is shifted in the picture frame PF in accordance with a travel distance determined therefor, so that it has a corrected position in a current cycle (CC≧0), of which a data is output (together with R-ID) as the corrected representative point location data D158 from the correcting means 106. Then, the cycle count CC is incremented such that CC=CC+1.

An output node 106a of the correcting means 106 directionally serves so that it sends the corrected location data D158 toward the switch 153, before the program flow for the correction goes to the end.

Therefore, updated data are processed at the fitness evaluating means 105, the relative relationship evaluating means 111 and the position correcting means 106, as described.

Upon an ending of such the correction, the node 106a is switched, so that a set of data D158 after a last correction is input to the motion vector detecting means 107 and the motion-compensated picture predicting means 108.

The detecting means 107 thus receives the corrected representative point location data D158, the representative point connection data D152 and respective data of the input picture PI and the reference picture PR. The location data D158 and the connection data D152 are cooperative with each other to provide a corrected or deformed triangular segmentation of an entire region of the picture frame PF, that defines a contour-adaptive allocation of representative points R(s, t).

The detecting means 107 processes the received data to detect a motion vector at each representative point R(s, t) having a last corrected position (x, y) in the picture frame PF, which vector is output (together with R-ID) as the motion vector data D159 to the picture predicting means 108.

The predicting means 107 receives the motion vector data D159, the corrected representative point location data D158, the representative point connection data D152 and the data of the reference picture PR, and processes them to determine an interpolated motion vector at each pixel position (x, y) on each corrected triangular segment and to calculate a motion-compensated pixel value by applying the interpolated motion vector to the reference picture PR, so that a resultant set of motion-compensated pixel values constitute the data D160 representing a prediction picture of the input picture PI.

The conventional method employs an energy minimizing principle for an adaptive correction of an allocation of representative points, by evaluating energy levels simply at a position of each representative point.

Therefore, even when a triple of representative points lying on vertices of a triangular segment are corrected in position to be located on nearest contour lines, respective boundary lines as three sides of the segment will not always extend along the contour lines. Like discussion will be concluded even if four or more representative points are arranged in one-to-one correspondence on vertices of a polygonal segment.

FIG. 3 is an illustration for describing the matter in a simple case in which a multiplicity of representative points R(s, t) are arranged on lattice points (s, t) of a triangular lattice so that triangular regions therein are each defined by three links or boundaries interconnecting a triple of neighboring representative points {R(s, t), R(s+1, t), R(s+1, t+1)} or {R(s, t), R(s, t+1), R(s+1,t+1)}.

Every triangular region is deemed as a unit segment. Pixels on three vertices of the segment constitute representative points. Motion vectors at the representative points (after correction) will be detected by the means 107, and motion vectors at respective pixels in the segment will be interpolated by the means 108 from the detected vectors.

A uniform initial allocation of representative points R(s, t) is illustrated in the left upper part of FIG. 3.

The initial allocation is to be corrected by the means 106 in an adaptive manner to a detected contour consisting of e.g. four contour lines such as shown in a left lower part of FIG. 3.

In the conventional method, an arbitrary pair of neighboring representative points are resiliently linked to each other so that, in the contour-adaptive correction, each representative point is shifted toward or onto a nearest contour line by a travel distance within an over-restricted range not to cause a significant variation in length of each associated link i.e. within a range not exceeding half a width of a narrow potential valley in a plan.

Accordingly, there is achieved an insufficiently adapted allocation, e.g. as illustrated in the right upper part of FIG. 3, in which segment boundaries or links between representative points fail to overlap the detected contour lines.

In other words, some corrected segments include contours lines in their internal regions, which means each of them includes at least two image regions different of movement from each other, as the image regions are defined by a contour line. For example, there may be picked up two or more objects moving in different manners.

However, even in such a case, the motion vectors at respective pixels in each segment are interpolated from the detected motion vectors at three vertices of the segment, thus resulting in an undue interpolation, causing a visually unnatural deformation as a distortion of a local image region in the predicted picture.

There will be described below how such a distortion is caused by the presence of a segment boundary unfitted to a contour line, with reference to FIG. 4.

FIG. 4 shows in an upper part thereof two neighboring couples of triangular regions Tr1 to Tr4 defined by nine interconnection lines between six pixels P×1 to P×6 in the picture frame PF (See FIG. 6A), as it has mapped therein a previous picture as the reference picture PR (See FIG. 1), and in a lower part thereof two neighboring couples of corrected triangular segments Sg1 to Sg4 defined by nine links between six representative points R1 to R6 in the picture frame PF, as it has mapped therein a motion-compensated prediction picture of a current picture (i.e. the input picture PI [See FIG. 1]).

For simplicity, there is not shown the current picture, which resembles the prediction picture as a whole.

In each mapped picture of FIG. 4, a dotted region represents an image of a moving object e.g. such as a square flat plate rightwardly flying, and a white region represents an image of a still background. The dotted region is defined by bold outlines as a contour of the moving object.

The moving object in the reference picture has a substantially right-angled single corner Cn, like a corner Cn' shown by imaginary broken lines in the prediction picture, so that the contour detecting means 102 (See FIG. 1) detects a contour with the corner Cn'.

The contour with corner Cn' is now concerned, as the representative points R3 and R4 have their initial positions vicinal to this contour.

Accordingly, by a correction at the means 106 (See FIG. 1), the representative points R3 and R4 are located on the concerned contour and the neighboring representative points R1, R2, R5 and R6 also are corrected in position as shown in the lower part of FIG. 4. As a result, the concerned contour intersects the segments Sg1 and Sg2.

Then, the detecting means 107 (See FIG. 1) detects motion vectors at the corrected representative points R1 to R6. The detected motion vectors substantially represent position vectors of the corrected points R1 to R6 minus those of the pixels P×1 to P×6, respectively, as the position vectors are defined in an x-y coordinate system associated with the common picture frame PF.

It is now assumed that a non-zero vector is detected as a motion vector at representative points R3 to R6 on the moving object, i.e. at respective vertices of the segments Sg3 and Sg4, and a zero vector is detected as a motion vector at representative points R1 and R2 on the background, i.e. at left vertices of the segments Sg1 and Sg2.

Then, in the predicting means 108 (See FIG. 1), all pixels (x, y) in each segment Sg1 to Sg4 have their motion vectors interpolated from the detected motion vectors at three vertices of the segment. Accordingly, the zero vectors detected at the representative points R1 and R2 are employed as two of three vectors for interpolating motion vectors at respective pixels on part of the moving object in the segment Sg1, and that at the representation point R1 is employed as one of three vectors for interpolating motion vectors at respective pixels on part of the moving object in the segment Sg2.

As a result a contour of object not deforming may be deformingly distorted, as if it contracted or extended. For example, in FIG. 4, the moving object in the reference picture (as well as in the unshown current picture) is defined by a single-angled contour, but that in the predicted picture is defined by a double-angled contour. Incidentally, the triangular regions Tr1 to Tr4 are shown to facilicate a comparison between pictures.

The present invention has been achieved with such points in mind.

SUMMARY OF THE INVENTION

It therefore is an object of the present invention to provide a system and a method for a motion-compensated interframe prediction permitting an error-reduced interpolation of motion vectors to generate a motion-compensated prediction picture relatively small of a deformed distortion.

To achieve the object, a first genus of the present invention provides a system for processing in a picture frame an input picture representing a current picture and a reference picture representative of a previous picture relative to the current picture to generate a motion-compensated interframe prediction picture for a coding of the input picture, the system comprising a first means for providing a set of location data representing present locations of a number of representative points in the picture frame and a set of connection data representing relationships for connecting the representative points to define boundary lines of a segment region having vertices thereof on the representative points, a second means for detecting a contour line of a moved image in the input picture to provide a set of position data representing a position of the contour line, a third means responsible to the set of location data, the set of connection data and the set of position data for correcting the present locations of the representative points to adapted locations thereof so that the segment region has one of the boundary lines thereof substantially fitted to the contour line, a fourth means for detecting first motion vectors between the input picture and the reference picture at the adapted locations of the representative points, and a fifth means for responding to the first motion vectors to interpolate therefrom second motion vectors between the input picture and the reference picture at pixels on the segment region having the vertices thereof at the adapted locations of the representative points and for responding to the second motion vectors for motion-compensating the reference picture to generate the prediction picture.

According to the first genus of the invention, boundary lines of a segment region defined by connecting a number of representative points are adapted by correcting locations of the representative points so that one of the boundary lines is substantially fitted to a detected contour line of a moved image, i.e. it extends substantially along the contour line, thus permitting an error-reduced interpolation of motion vectors to generate a motion-compensated prediction picture relatively small of a deformed distortion.

There will be described below how such the fitness of a segment boundary to a contour line is effective, with reference to FIG. 5.

FIG. 5 shows an illustration for describing the matter, in correspondence to FIG. 4. Corresponding elements are designated by like reference characters.

Also in FIG. 5, a dotted region represents an image of a moving object that is identical to the object of FIG. 4, and a white region represents an image of a still background.

The dotted region is defined by bold outlines as a contour of the moving object.

The contour consists of two contour lines. In FIG. 5, one contour line overlaps a boundary line R3–R4 of a segment Sg2, another contour line extends along an unshown segment boundary. The contour lines intersect none of four segments Sg1 to Sg4.

Like the case of FIG. 4, it is assumed that a non-zero vector is detected as a motion vector at each of representative points R3 to R6 on the moving object, i.e. at repective vertices of the segments Sg3 and Sg4, and a zero vector is detected as a motion vector at representative points R1 and R2 on the background, i.e. at left vertices of the segments Sg1 and Sg2.

Then, all pixels in each segment Sg1 to Sg6 have their motion vectors interpolated from the detected motion vectors at three vertices of the segment.

Accordingly, those motion vectors employed for the interpolation at any pixel in segments Sg3 and Sg4 covering the moving object have their due reflections of a motion of the object, and are free from an undue detection of the motion, thus effectivly suppressing an occurrence of a deformed distortion that otherwise would be developed as if a contraction or extension of the object was observed.

Further, any pair of pixels facing each other, with the boundary line R3–R4 in between, have their motion vectors interpolated either by referencing vectors detected at representative points located on one side of the boundary line R3–R4 and the other by referencing those detected at representative points located thereon or the other side thereof.

There is thus permitted an adaptive interpolation of motion vectors to a structure of the moving object, as the segment boundary line R3–R4 is fitted to a contour line of the object.

Moreover, to achieve the object described, a second genus of the present invention provides a system for a motion-compensated inter-frame prediction to be performed in a coding of a motion picture in a manner in which a set of motion vectors at a plurality of representative points located in a picture frame is employed to interpolate therefrom a set of motion vectors at respective pixels in the picture frame, the system comprising an initial representative point allocation setting means for setting up an initial allocation of the representative points to output a set of initial representative point location data and a set of representative point connection data, a contour detecting means for analyzing an input picture to detect a contour, a segment boundary detecting means for selecting in an initial time the set of initial representative point location data and thereafter a set of corrected representative point location data, as a set of representative point location data, referring to the set of representative point location data and the set of representative point connection data, and detecting boundary lines of a segment defined by connecting the representative points, to output a set of position data of the segment boundary lines, a segment boundary fitness evaluating means employing the set of position data of the segment boundary lines for evaluating a fitness of a respective one of the segment boundary lines to the detected contour to output an evaluated fitness data, a representative point fitness evaluating means using the evaluated fitness data of those of the segment boundary lines connected to a respective concerned one of the representative points for evaluating a fitness of the concerned representative point to the detected contour to output an evaluated fitness data, a representative point location correcting means using the evaluated fitness data of the representative points for correcting locations of the representative points to output corrected representative point locations, deciding if results of the correction meet a predetermined ending condition, and returning when they do not meet to an execution of the means for detecting the segment boundary lines, a motion vector detecting means using the set of representative point connection data for detecting motion vectors between frames of the input picture and a reference picture at the corrected representative point locations, and a motion-compensated picture predicting means using the corrected representative point locations, the set of representative point connection data, the motion vectors and the reference picture for generating to output a predicted picture.

According to the second genus of the invention, in an evaluation process for corrections of respective locations of representative points, there is performed not only an evaluation of each representative point but also an evaluation of each boundary line of a segment defined by connecting associated representative points so that evaluations of respective pixels on the boundary line are concurrently executed, whereby the representative points are effectively corrected, causing the segment boundary line to extend along a contour line of a moving object, thus reducing an error ratio in an interpolation of motion vectors, permitting a motion-compensated inter-frame prediction relatively small of a deformed distortion.

This effect will be further described below with reference to FIG. 3.

FIG. 3 illustrates a contour-adaptive correction of representative points, in which a uniform initial allocation of the representative points shown in the left upper part of the figure is corrected for an adaptation a detected square contour consisting four contour lines in the left lower part of the figure, by the conventional method described into an insufficiently adaptive allocation shown in the right upper part of the figure, and by way of a proposed correction in the invention into an effectively adapted allocation shown in a right lower part of the figure, where boundary lines of a segment defined by connecting associated representative points are corrected so as to extend along the contour lines.

As the motion detection at each representative point is effected with attentions concentrated on a moving object, the interpolation of motion vectors at pixels within a contour of the object does not need inappropriate representative points outside the object to be referenced, thus successfully suppressing an occurrence of a visually unnatural deformed distortion.

According to a species of the second genus of the invention, the representative points are uniformly arranged in the initial allocation thereof, the detected contour consists of a plurality of contour lines, and the system further comprises an initial representative point location correcting means for shifting those of the representative points vicinal to the contour lines so that they are each moved in advance from an initial location thereof onto a nearest one of the contour lines.

According to the species of the invention, some representative points are located in advance on contour lines, permitting a reduced convergence time in adaptation to the contour lines.

According to another species of the second genus of the invention, the system further comprises a potential field setting means for setting a potential field in dependence on a distance from the detected contour, the potential field being employed for a contour fitness adaptation of pixels.

According to this species of the invention, an introduced potential field permits the use of an energy minimization principle for correcting an allocation of representative points so that boundary lines of segments defined by connecting the representative points may be fitted onto contour lines of a moving object.

According to an individual of this species of the invention, the potential field setting means provides the potential field in dependence on a function with a tendency responsible for a positional change to cause an increased variation in potential value, as it is at a smaller distance to the contour, and a decreased variation in potential value, as it is at a longer distance from the contour.

According to the individual of the invention, in the correction of locations of representative points by the energy minimization principle, potential energy is set so that a potential variation due to a positional change becomes larger, as a distance to a contour line becomes smaller. Accordingly, a representative point nearer to the contour line is drawn in with a stronger pulling force, arriving at a corrected position in a shorter time.

To the contrary, by a setting such that a potential variation due to a positional change becomes smaller, as a distance from a contour line becomes larger, a representative point not vicinal to the contour line is hardly affected by the positional change, permitting an effective contribution to correcting representative points without destroying a segment structure.

According to still another species of the second genus of the invention, the system further comprises a representative point location relative relationship evaluating means responsible to the set of representative point connection data and the set of representative point location data for evaluating relative potential energy acting in dependence on a relationship of a relative position between associated ones of the representative points, to provide an evaluated value for use in the representative point location correcting means.

According to this species of the invention, a relationship of a relative position between representative points is employed for a positional correction of the representative points, thus permitting an allocation of representative points to be corrected without undue disturbances.

Further, to achieve the object, a third genus of the present invention provides a method for processing in a picture frame an input picture representing a current picture and a reference picture representative of a previous picture relative to the current picture to generate a motion-compensated inter-frame prediction picture for a coding of the input picture, the method comprising the steps of providing a set of location data representing present locations of a number of representative points in the picture frame and a set of connection data representing relationships for connecting the representative points to define boundary lines of a segment region having vertices thereof on the representative points, detecting a contour line of a moved image in the input picture to provide a set of position data representing a position of the contour line, responding to the set of location data, the set of connection data and the set of position data for correcting the present locations of the representative points to adapted locations thereof so that the segment region has one of the boundary lines thereof substantially fitted to the contour line, detecting first motion vectors between the input picture and the reference picture at the adapted locations of the representative points, and responding to the first motion vectors to interpolate therefrom second motion vectors between the input picture and the reference picture at pixels on the segment region having the vertices thereof at the adapted locations of the representative points and for responding to the second motion vectors for motion-compensating the reference picture to generate the prediction picture.

According to the third genus of the invention, a predicted picture of an input picture is permitted to have a visually unnatural deformed distortion effectively suppressed about a contour of a moved image in the input picture.

Accordingly, in an application to a coding of a motion picture, the invention permits a picture to be reproduced with a successfully reduced visual distortion. even in a case a coding of a prediction error is difficult.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

Figure 1:
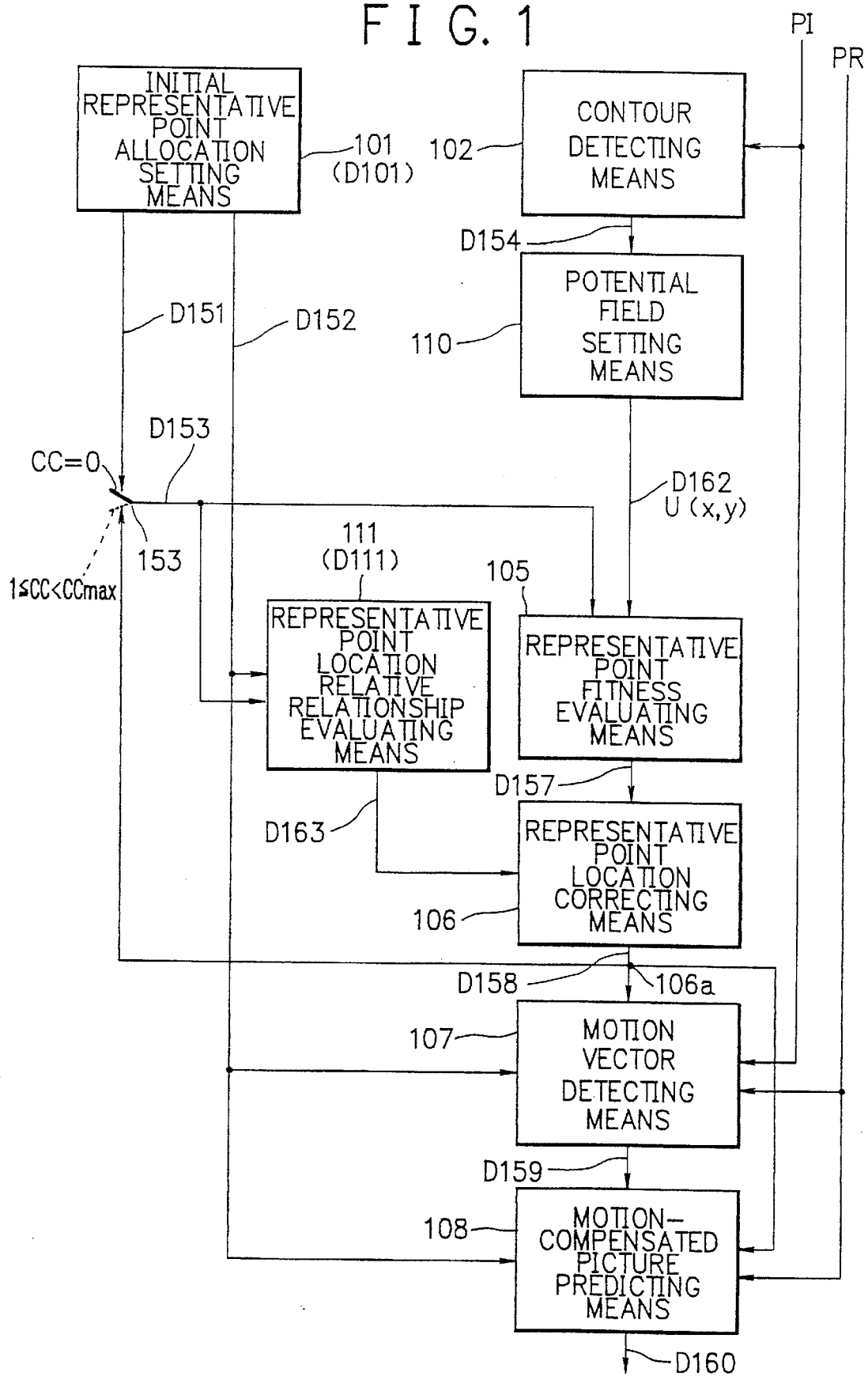
FIG. 1 is a block diagram of a system for a motion-compensated inter-frame prediction to be performed substantially in accordance with a conventional method, in combination with additional conjectures.

There will be detailed below preferred embodiments of the present invention, with reference to the accompanying drawings. Like or corresponding members are designated by like reference characters.

FIGS. 2 and 11–14 show a motion-compensated inter-frame prediction system according to an embodiment of the invention, respectively.

Figure 2:
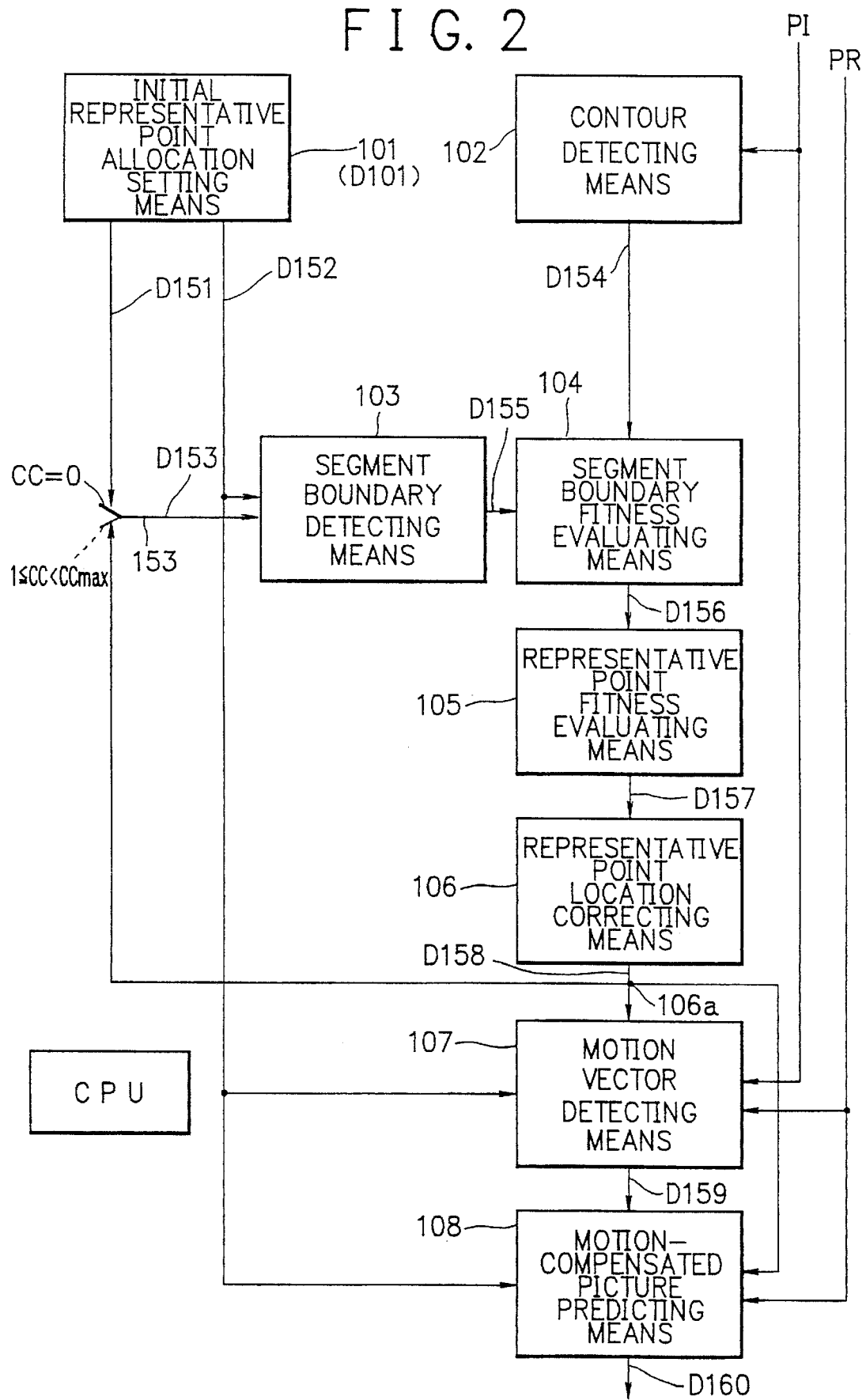
FIG. 2 is a block diagram of a motion-compensated inter-frame prediction system according to an embodiment of the invention.
Figure 3:
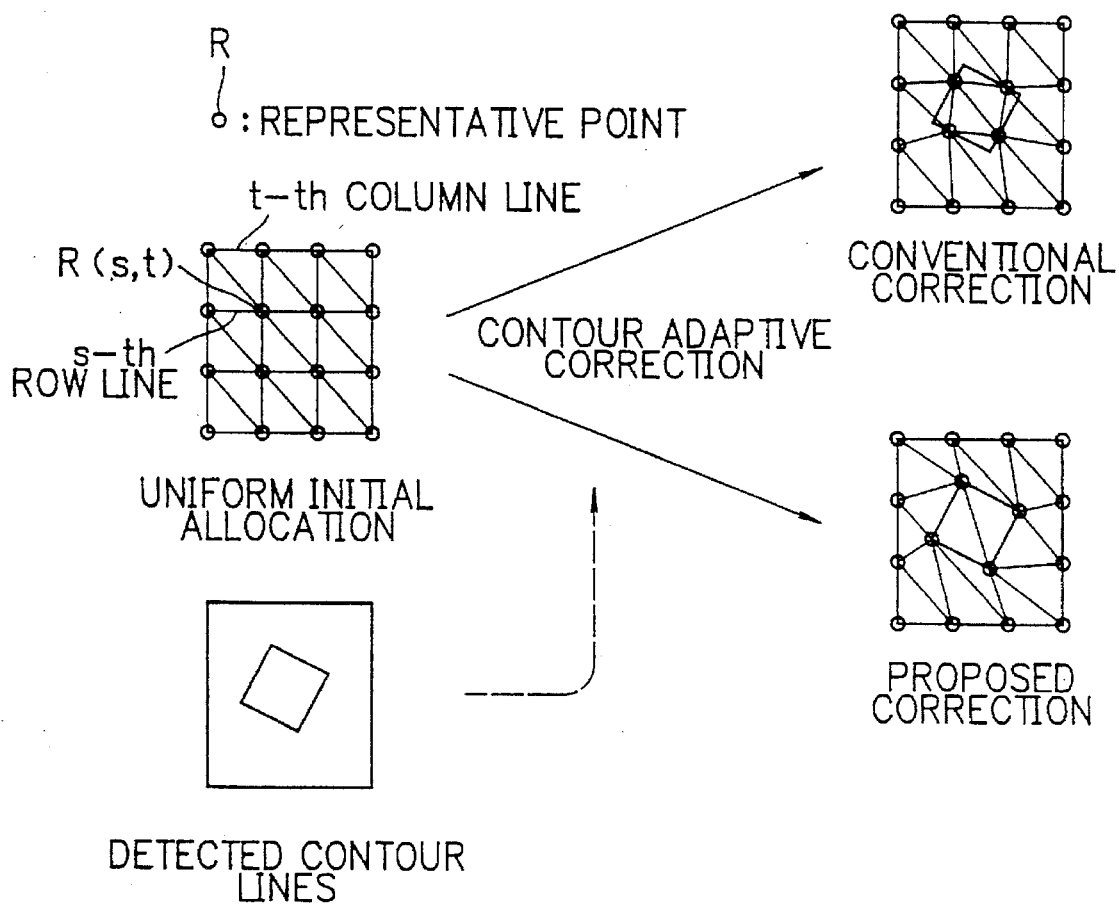
FIG. 3 is an illustration for a comparison between a conventional method and a proposed method according to the invention.
Figure 4:
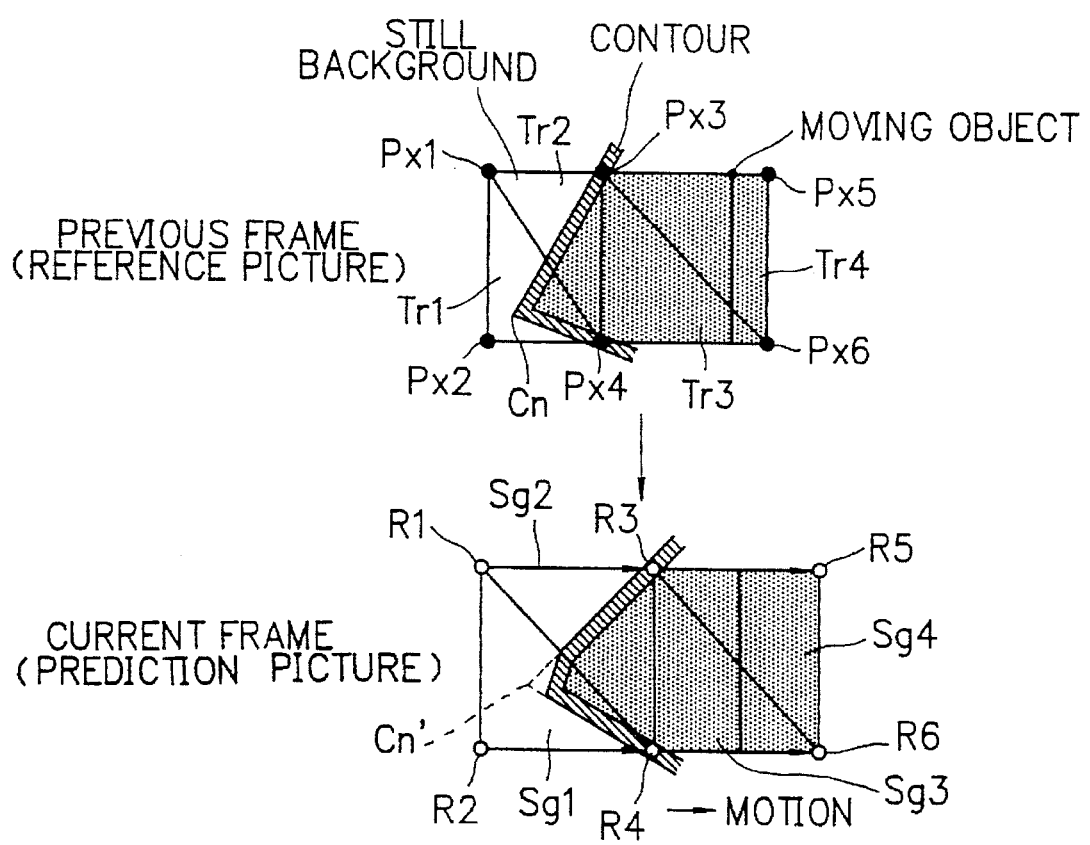
FIG. 4 is an illustration for describing a conventional method in which a contour line intersects boundary lines of a segment defined by connecting representative points.
Figure 5:
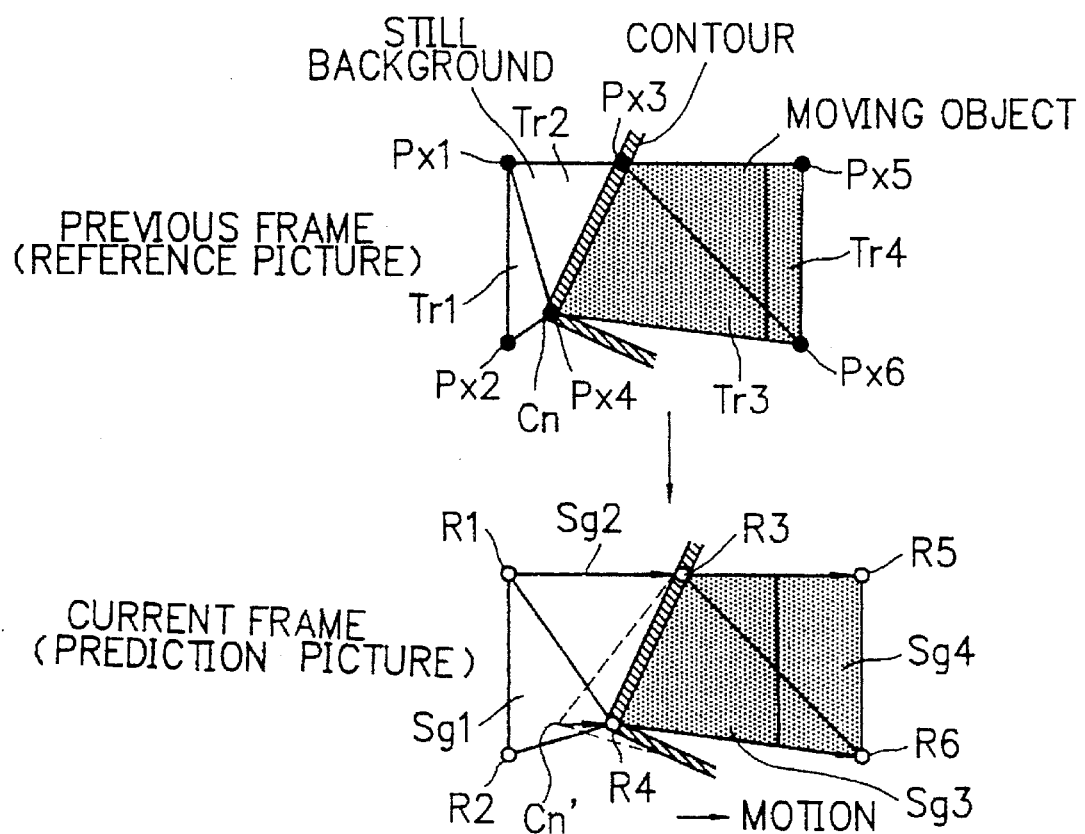
FIG. 5 is an illustration for describing a proposed method in accordance with the invention in which a boundary line of a segment extends along a contour line.

In the system of FIG. 2, an initial representative point allocation setting means 101 sets up a basic initial allocation of representative points to output a set of initial representative point location data D151 and a set of representative point connection data D152, and a contour detecting means 102 analyzes an input picture PI to detect a contour line representative data D154.

A switch means 153 selects in an initial time (CC=0) the set of initial representative point location data D151, and thereafter ($1 \leq CC \leq CCmax$) a set of corrected representative point location data D158, as a set of representative point location data D153.

A segment boundary detecting means 103 responds to the set of representative point location data D153 and the set of representative point connection data D152, to detect boundary lines of segment defined by connecting the representative points, and outputs a set of position data D155 of the segment boundary lines.

A segment boundary fitness evaluating means 104 employs the set of position data D155 of the segment boundary lines for evaluating a fitness of a respective one of the segment boundary lines to the detected contours to output a o set of evaluated fitness data D156.

A representative point fitness evaluating means 105 uses the set of evaluated fitness data D156 of those of the segment boundary lines connected to a respective concerned one of the representative points for evaluating a fitness of the concerned representative point to the detected contour, and outputs a set of evaluated fitness data D157.

A representative point location correcting means 106 uses the set of evaluated fitness data D157 of the representative points for correcting a present location of each insufficiently fitted representative point to have an increased fitness to output an updated set of corrected representative point location data D158, deciding if results of the correction meet a predetermined ending condition. Unless they meet the condition, the flow of an associated program goes to a set for an execution of the means 103 for detecting segment boundary lines. When they meet the condition, a directional node 106a is switched so the data D158 go down in FIG. 2.

In this respect, the system of FIG. 2 as well as other embodiments of the invention has a central processing unit CPU for controlling respective units therein.

Then, a motion vector detecting means 107 uses the set of representative point connection data D158 for detecting motion vectors between frames of the input picture PI and a reference picture PR at the corrected representative point locations.

Then, a motion-compensated picture predicting means 108 uses the set of corrected representative point location data D158, the set of representative point connection data D152, the motion vectors D159 and the reference picture PR for generating to output a predicted picture D160.

Figure 11:
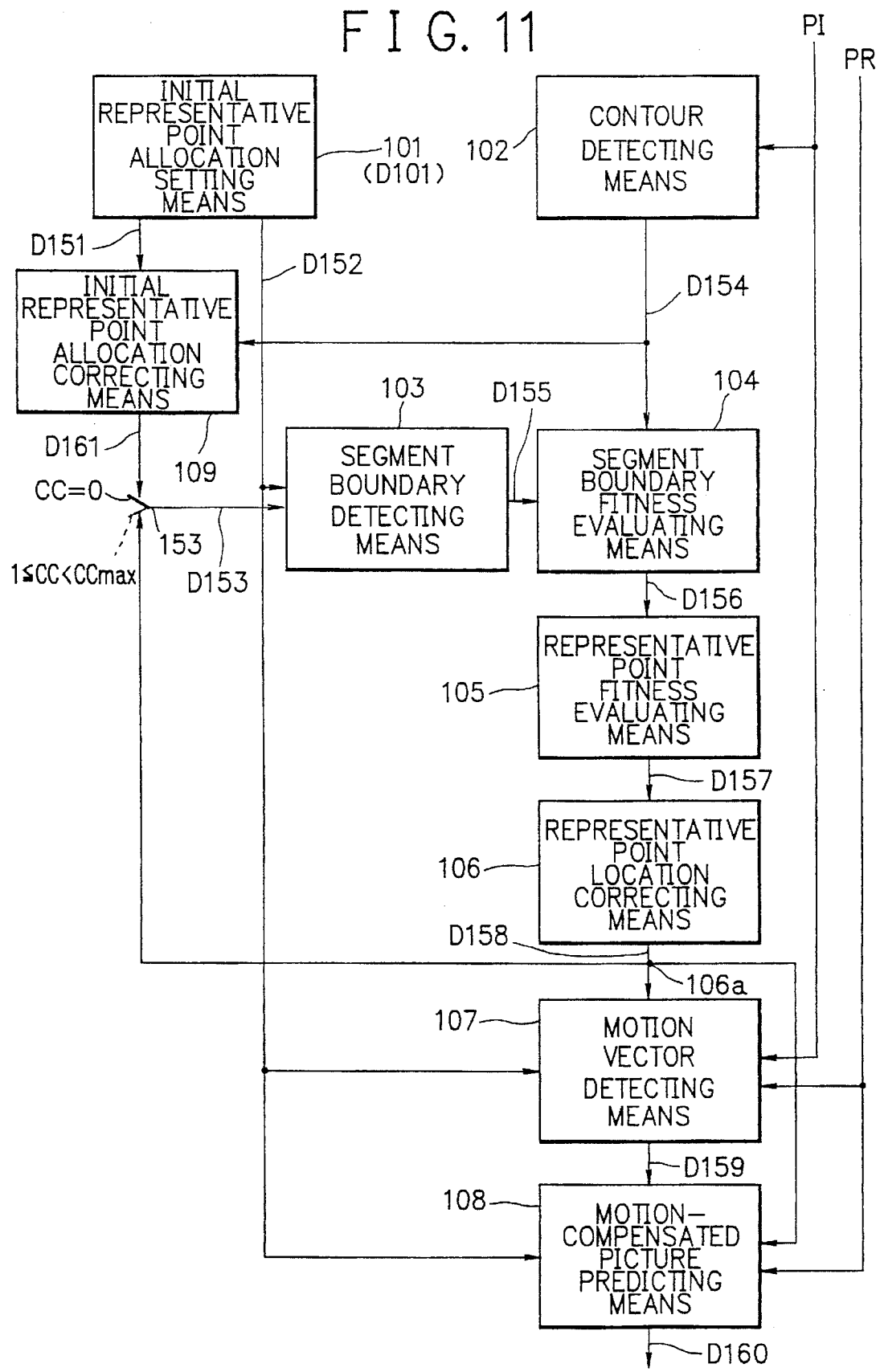
FIG. 11 is a block diagram of a motion-compensated inter-frame prediction system according to an embodiment of the invention.

In the system of FIG. 11, to permit a reduced convergence time in adaptation to detected contour lines (D154) there is provided an initial representative point allocation correcting means 109 for shifting those representative points vicinal to the contour lines so that the points are each moved from an initial location thereof onto a nearest one of the contour lines, before outputting a set of corrected initial representative location data D161.

Figure 12:
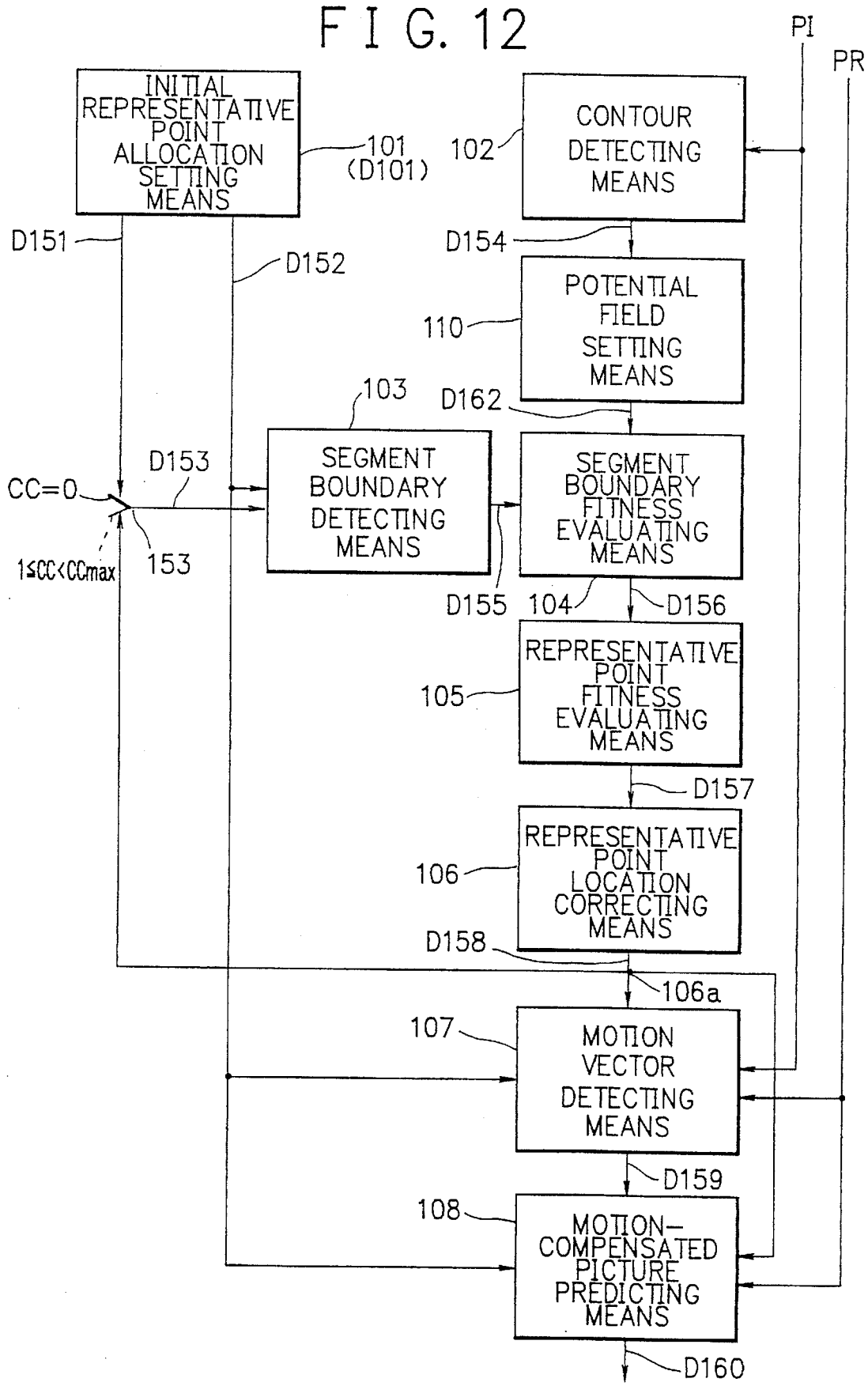
FIG. 12 is a block diagram of a motion-compensated inter-frame prediction system according to an embodiment of the invention.

In the system of FIG. 12, a potential field setting means 110 serves for generating a potential field D162 in dependence on a distance from each detected contour. The potential field D162 is employed by a segment boundary fitness evaluating means 104 for evaluating a fitness of each segment boundary to an associated contour line.

In this system, therefore, an energy potential is introduced in the fitness evaluation of FIG. 2, to permit the use of an energy minimization principle for correcting an allocation of representative points.

Figure 13:
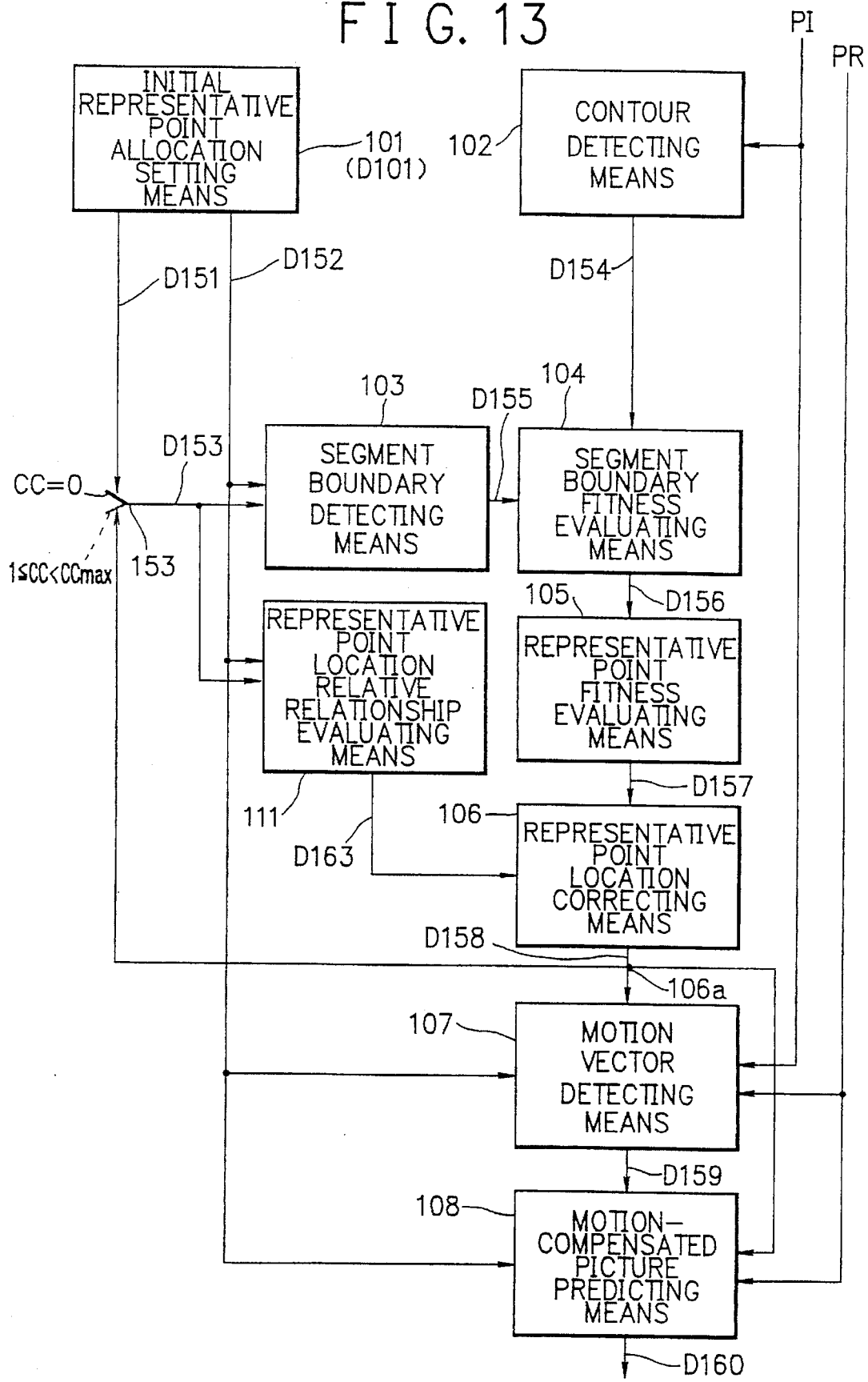
FIG. 13 is a block diagram of a motion-compensated inter-frame prediction system according to an embodiment of the invention.

The system of FIG. 13 includes a representative point location relative relationship evaluating means 111 responsible to a set of representative point connection data D152 and a set of representative point location data D153 for evaluating relative potential energy acting in dependence on a relationship of a relative position between associated ones of representative points, to provide a set of data on evaluated values D163. A representative point location correcting means 106 employs the data D163 and a set of evaluated data D157 on a fitness of each representative point.

In this system, therefore, a relationship of a relative position between representative points is employed for a positional correction of the representative points.

Figure 14:
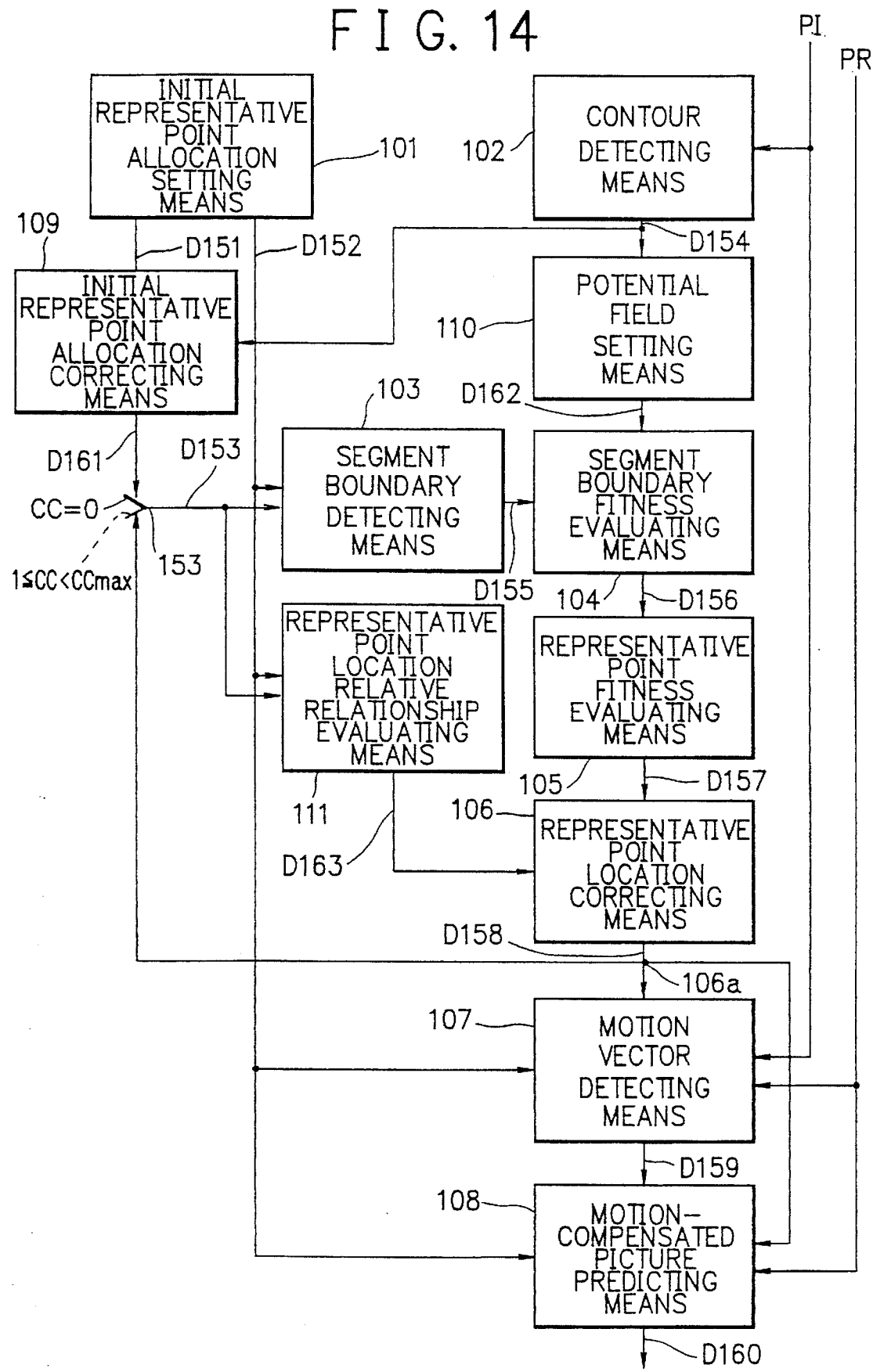
FIG. 14 is a block diagram of a motion-compensated inter-frame prediction system according to an embodiment of the invention.

The system of FIG. 14 includes respective means in the system of FIG. 2 and respective means (109, 110, 111) added in the systems of FIGS. 11–13.

Respective means will be described below.

The initial representative point allocation setting means 101 serves for setting up as a basis for correction an uniform initial allocation of representative points.

Figures 6A, 6B, 7A, 7B, 7C, 7D:
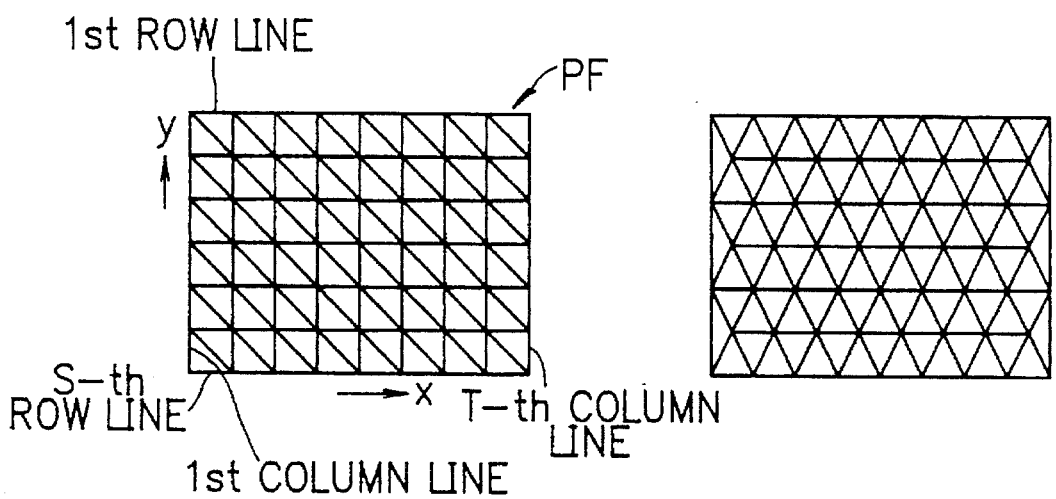
FIGS. 6A and 6B are illustrations of initial allocations of representative points, respectively.
FIGS. 7A to 7D show maps of valued distances according to different definitions, respectively.

FIGS. 6A and 6B show examples of the initial allocation, respectively. In the example of FIG. 6A, there is employed a lattice structure consisting of an array of square unit patten unit patterns each having an additional diagonal line. The example of FIG. 6B uses a lattice structure composed of an array, of equi-lateral triangular unit patterns. In either lattice, each cross point constitutes a representative point.

The initial allocation of representative points may be irregular, deformed or partially contour-adapted in advance to permit a rapid convergence of adaptation, like the system of FIG. 11 employing the initial representative point allocation correcting means.

In a preferrable modification, those representative points vicinal to detected contour lines may be each shifted onto a nearest contour line.

In a practical case, the distance on a picture may be defined in a various manner.

For example, a four-neighborhood distance ($l^1$-norm distance) is measured from a representative point selected as a start point of a zero distance, by expanding a region of four-neighborhood points in a fatting manner in unit of one pixel. In due course, the expanded region arrives at one of detected contour lines. A contour line it first arrives at is a nearest one to the start point. Pixels on the nearest contour line are deemed nearest, and vicinal representative pixels are moved thereon.

Distances on a picture may be defined in terms of an $l^N$-norm distance (N=1, 2, . . . , ∞) or of an octagonal distance.

The $l^N$-norm distance is equivalent to the four-neighborhood distance when N=1, a euclidean distance when N= 2, and an eight-neighborhood distance when N=∞.

Letting d(x, y) be a distance of a position (x, y) from an origin, it so follows that:

$l^N$-norm distance (N=1, 2, . . . , ∞):

$$d(x,y) = \sqrt[N]{|x|^N + |y|^N}$$

four-neighborhood ($l^1$-norm) distance:

$$d(x, y) = |x| + |y|$$

euclidean ($l^2$-norm) distance:

$$d(x,y) = \sqrt{|x|^2 + |y|^2}$$

eight-neighborhood ($l^\infty$-norm) distance:

$$d(x, y) = \max\{|x|, |y|\}$$

octagonal distance:

$$d(x, y) = \max\{|x|, |y|, [2(|x|+|y|+1)/3]\},$$

where [x] means a largest integer not exceeding x.

FIGS. 7A to 7D show examples of valued distances from a central zero-distance pixel, as they are measured by scales of the distances described.

In the initial allocation correction, there may be provided a threshold of distance so that a representative point may be moved if it has a contour line within the threshold, but may not if it has not, to suppress large positional changes of representative points.

Incidentally, the location data D151 may each comprise a combination of an R-ID of a concerned representative point R(s, t) and a pair of coordinates (x, y) of a position of the point R(s, t) in the picture frame, as one frame side constitutes an x-axis and another frame side perpendicular thereto constitutes a y-axis (See FIG. 6A). The coordinates (x, y) may be represented by a pixel address.

The connection data D152 may each comprise a pair of R-IDs of representative points connectable to each other, or a combination of an R-ID of a concerned representative point R(s, t) and respective R-IDs of two, three, four or six representative points R(s', t'; s'≠s, t'≠t) to be connected thereto, or may each comprise a combination of the R-ID of the concerned point R(s, t) and a data on a number of representative points R(s', t') to be connected thereto.

Alternately, the data D152 may be each composed of a combination of the R-ID of the concerned point R(s, t) and a lattice size data, such as S×T, that may be informed in advance to related units, or simply of the R-ID of the point R(s, t) subject to a provision of a commonly accessible memory for storing therein the lattice size data or a provision of an exclusive software program or logic circuit for processing the R-ID to determine how to connect the point R(s, t) to other representative points.

The contour detecting means 102 may detect contour lines in a various manner.

In the embodiments described, the input picture PI is image-segmented, and boundaries of resultant segments are detected as contours of moved images, to permit an exact extraction of a structure of of an object.

The image segmentation may be achieved by e.g. a clustering with respect to a pixel-level characteristic quantity such as a luminance, a color, a position and/or a motion, as disclosed in the Japanese Patent Application No. 6-196552.

The contour detection may be achieved by applying a threshold to an inter-frame difference picture to detect differences larger than the threshold as contours, or by use of an edge detection filter, or in any other alternative manner.

In the case of an image segmentation also, there may be used a split and merge method, a histogram, or any other applicable method.

Figure 8:
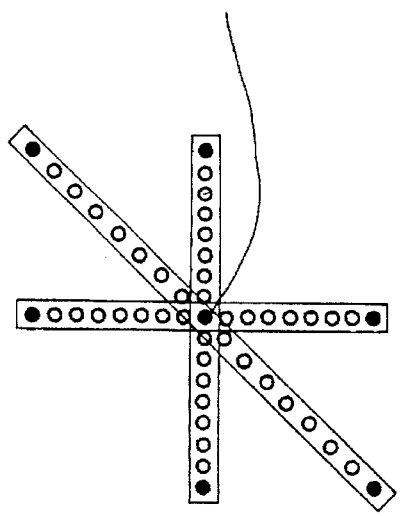
FIG. 8 is an illustration for describing pixels employed for an evaluation of energy according to an embodiment of the invention.

The segment boundary detecting means 103 detects pixels constituting each boundary line of each segment, which detection will be described below in a limited manner, as it relates to an evaluation of a fitness at a certain representative point, with reference to FIG. 8.

When a representative point is concerned, an associated representative point connection data (D152) is processed to select other representative points connected to the concerned representative point. Then, for each connection, there are selected two points, the concerned representative point and the other selected point. A segment line interconnecting the two points is deemed as a segment boundary line connecting to the concerned representative point. By use of the representative point location data D153, respective locations of the two representative points are determined to be output as a position data (D155) of the segment boundary line.

The potential field setting means 110 provides a potential field D162, which is employed to define a potential value for a correction of representative points, which use will be described below.

An employed scale of distance may be any of those described in conjunction with the initial representative point allocation setting means 101. In any case, the distance between a representative point and a contour line is defined as a distance from the representative point to pixels on a nearest contour line.

In the conversion from a distance value to a potential value, the former value may be directly employed as the latter value.

Or otherwise, there may be set a varying potential field depending on a function of a distance from any concerned contour line, with an increased tendency to draw in a representative point near to the contour line, but with a reduced tendency to be influenced by a positional change of a representative point far from the contour line.

For example, it may be of a type inversely proportional to a second power of a distance.

In this case, letting d(x, y) be a distance from a concerned contour line to a pixel (x, y), a potential value P(x, y) at the pixel may well be expressed such that:

$$P(x, y) = A/\{d(x, y)^2 + B\} \qquad (1),$$

where A (>0) is an appropriate constant and B (>0) is an added term for the conveniency of calculation not to render 0 the denominator of the expression (1).

The segment boundary fitness evaluating means 104 evaluates a fitness of each segment boundary line to a corresponding contour line, which will be described below, assuming that the fitness is evaluated of a particular boundary line of a segment in a certain allocation of representative points.

First, the segment boundary position data D155 are processed to sequentially calculate locations of pixels constituting the segment.

Then, a fitness to a detected contour line is evaluated of each pixel.

In the case a potential field is available, a potential value thereof at the pixel position is output, as it is an evaluated value. In this case, the pixel is better adapted to the contour line, as the smiler the value is.

In a case the fitness is to be evaluated without using the potential field, a distance from the pixel to a nearest contour line may be output as an evaluated fitness. The distance may be measured by any scale described. In this case also, the pixel is better adapted to the contour line, as the smaller the distance is.

It is assumed that the segment boundary line has a fitness equivalent to an average value per pixel of evaluated fitnesses of the pixels. As the fitness of each pixel is defined as described above, the fitness of the boundary line should be better, as the smiler the average value is.

The fitness of the boundary line is not estimated by a total of the fitness values of pixels, but by the average value for the following reason.

If a total is employed in a case the pixel-level fitness is always defined by a negative value, one may take as many negative values as possible to render small the total, thus causing a tendency to render the boundary line long by a correction. On the other hand, in the case where the pixel-level fitness is always defined by a positive value, one may remove as many positive values as possible to render small the total, thus causing a tendency to render the boundary line short by a correction. To avoid such tendencies, the average is employed.

In this respect, letting P(x, y) be a pixel-level evaluation at a pixel location (x, y), a k-th boundary line $BL_k$ has at its position a fitness M(k) such that:

$$M(k)=\{\Sigma P(x, y)\}/N_k \qquad (2),$$

where $N_k$ is a number of pixels (x, y) constituting the boundary line $BL_k$, and the sum $\Sigma$ is taken of the number of pixels (x, y) $\in BL_K$. Therefore, an estimation of fitness is permitted, irrespective of a length of the boundary line.

The representative point fitness evaluating means 105 evaluates a fitness of any representative point to each contour line, which evaluation will be described below, concerning an i-th identified representative point Ri in a present allocation of representative points for evaluation of the fitness relative to a contour line.

In the case a potential field is available, the fitness of the representative point Ri at its present location is defined as a total of the fitnesses of segment boundary lines connecting thereto.

In other words, using the fitness M(k) of k-th boundary line $BL_k$ and letting E(i) be the fitness of the i-th representative point Ri, it so follows that:

$$E(i)=\Sigma M(k) \qquad (3),$$

where the sum $\Sigma$ is taken of a number of boundary lines $BL_K$ connecting to the point Ri, i.e. $BL_K \rightarrow Ri$ (the arrow $\rightarrow$ means a connection).

Namely, the fitness E(i) is not estimated simply by a relative distance of the point Ri to a contour, but is evaluated as a total of fitnesses M(k) of segment boundary lines $BL_K \rightarrow Ri$, as the fitness M(k) of each boundary line $BL_K \rightarrow Ri$ is an averaged value of fitnesses P(x, y) of all pixels (x, y) that constitute the boundary line, as defined. Therefore, the boundary line, which inherently is an imaginary line for a calculation, can be adapted to extend along a concerned contour line, when associated representative points are corrected in position.

The representative point location correcting means 106 corrects a present location of each representative point, which correction will be described below, as it is repeated to have a higher fitness (i.e. a smiler fitness value in terms of a relative distance between a concerned representative point and a nearest detected contour line).

In a basic case, a fitness of the representative point in concern is measured by a calculation at the present location and at any location (x, y) within a predetermined distance range therefrom, as the representative point is provisionally moved vertically and horizontally within the range, before it is shifted to a corrected or updated location where a highest fitness was observed. Like correction is effected of every representative points. As a matter of course, any representative point R(s, t) on any of four sides (s=0 or S, t=0 or T) of the picture frame PF (See FIG. 6A) is bound in movement to locations on the side, and each representative pixel R(0, 0), R(S, 0), R(0, T), R(S, T) at four corners of the picture frame PF is fixed all the way, so that every pixel (x, y) on the picture frame PF guarantees a predicted pixel value to be defined in a later motion-compensated inter-frame prediction process at the means 108.

Such the correction of any representative point affects other representative points' fitnesses.

Therefore, recorrection of all representative points is repeated a predetermined number of times ($CC_{max}-1$) or until it reaches a converged state where no changes of fitness or no correction of location may be observed.

In correction of representative point location, it is desirable to hold the lattice structure of segments within a range free of a significant deformation.

In this respect, the representative point location relative relationship evaluating means 111 may be employed for evaluating a relatively acting restrictive relationship between associated representative points that may be provided as a resilient bias to each of the associated points in aid of the potential energy.

For example, neighboring representative points may be connected by a resilient link to each other to provide resilient energy in proportion to a length change from a natural length of the link.

Further, for the correction of representative point location, assuming each representative point as a mass, a motion equation of the mass may be solved to determine how the mass moves with forces acting thereon due to the potential energy and the resilient bias.

In this case, there may be assumed a potential field having a funnel like negative potential surface about each end of each contour line, with a flat zero potential extending over remaining places.

The motion vector detecting means 107 detects a motion vector at each adapted representative points (i.e. at each finally corrected location of the point), which detection will be described below.

The detection of a motion vector may be by a block matching, in which a square block of a fixed size may be employed as a target region of matching without using the representative point connection data D152.

In a case a matching in pursuit of each representative point is essential, there may be employed a block matching with a weighting progressively biased to be heavier as the representative point becomes nearer.

For example, letting ($x_0$, $y_0$) be a location of the representative point and RG=$\{(x, y) | x_1 \leq x \leq x_2, y_1 \leq y \leq y_2\}$ be a matching estimation region, there may be set a weight w(x, y) at an arbitrary estimation position (x, y) such that:

$$w(x, y)=bs-(|x-x_0|+|y-y_0|) \qquad (4),$$

where bs=max $\{|x_1-x_0|+|y_1-y_0|$, $|x_1-x_0|+|y_2-y_0|$, $|x_2-x_0|+|y_1-y_0|$, $|x_2-x_0|+|y_2-y_0|\}$.

There may be set a voluntary weighting factor map within a matching estimation region.

At the means 107 in concern, each motion vector is detected by selecting one of candidate vectors so that a prediction error Err is minimized.

For a candidate vector ($V_x$, $V_y$), the prediction error Err($V_x$, $V_y$) is estimated, letting C(x, y) be a pixel value of the input picture PI and P(x, y) be a pixel value of the reference picture PR, such that:

$$Err(V_x, V_y)=\Sigma\{[C(x, y)-P(x+V_x, y+V_y)]^2 \cdot w(x, y)\} \qquad (5),$$

where the sum $\Sigma$ is taken of respective pixels as estimation positions (x, y) in the matching estimation region RG.

To reduce a burden of calculation, the estimation may be made by using a sum of absolute values in place of the second-power values, such that:

$$Err(V_x, V_y)=\Sigma\{|C(x, y)-P(x+V_x, y+V_y)|w(x, y)\} \qquad (6),$$

where the sum $\Sigma$ is taken of respective estimation positions (x, y) in the matching estimation region RG.

In the block matching, the estimation region may be hexagonal region composed of a pair of triangular segments neighboring a concerned representative point.

19

In this case, the representative point connection data D152 may be employed to determine the hexagonal region. As a matter of course, such the estimation region may be other than a hexagonal, along periphery of the picture frame PF.

The motion vector detected by a matching may be corrected by referring to a prediction result.

For example, a motion vector search range may be set about a motion vector detected by the matching and, for each candidate vector therein, a prediction error of motion compensation may be estimated within a triangular range neighboring a concerned representative point, to select one candidate vector minimum of the prediction error as a motion vector to be detected.

The motion-compensated picture predicting means 108 generates an inter-frame prediction picture, which generation will be described below.

First, the corrected representative point location data D158 and the representative point connection data D152 are processed to determine a triangular lattice.

Then, for each pixel (x, y) in each triangular segment defined by the lattice, a linear interpolation is made to determine an interpolated motion vector on the pixel, from motion vectors (D159) detected at representative points on three vertices of the triangular segment.

Figure 9:
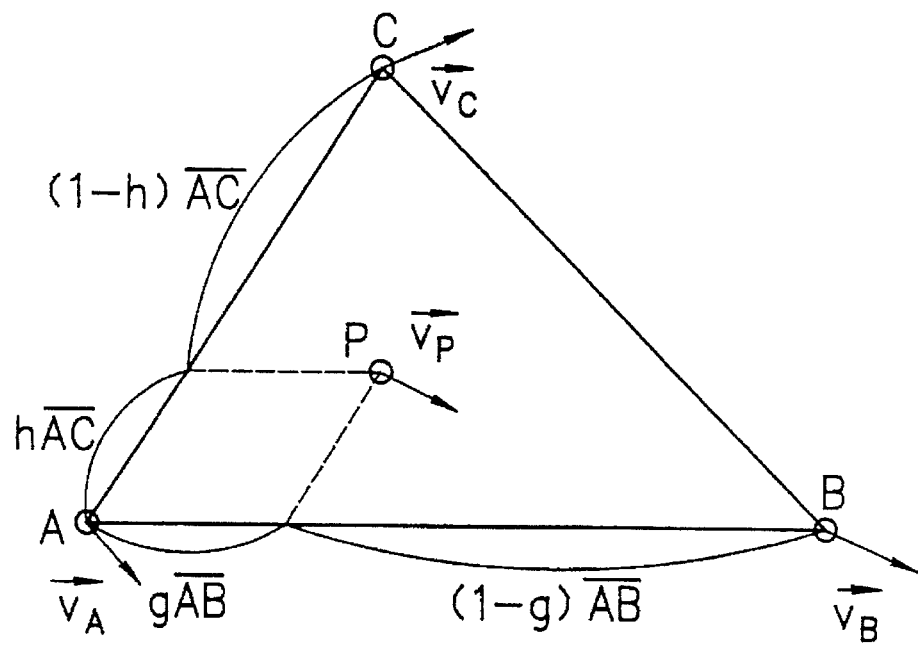
FIG. 9 is a graph for describing a linear interpolation of a motion vector on a pixel in a triangular segment according to an embodiment of the invention.

FIG. 9 is a graph for describing the interpolation.

In FIG. 9, to calculate an interpolatory motion vector $\vec{v}_P$ at an arbitary pixel P on a triangular segment ABC, three detected motion vectors $\vec{v}_A$, $\vec{v}_B$ and $\vec{v}_C$ at three vertices A, B and C of the segment ABC are processed such that:

$$\vec{v}_P = (1-g-h)\vec{v}_A + \vec{v}_B + \vec{v}_C \quad (7),$$

where g and h are division ratios of segment sides AB and AC as oblique coordinates to define the pixel position P(x, y)=P(g,h), repsectively.

Figure 10:
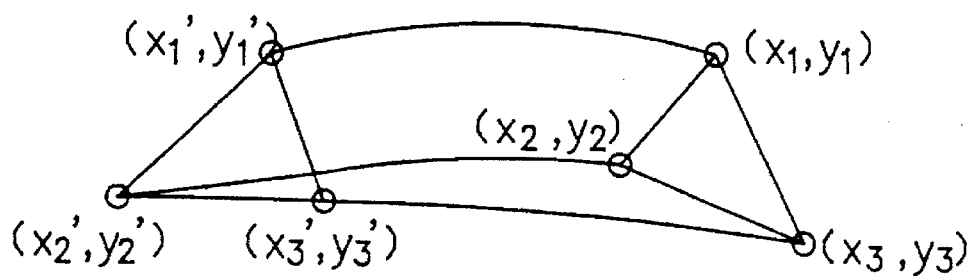
FIG. 10 is a graph for describing a method for a motion-compensated prediction to be performed by mapping a triangular section according to an embodiment of the invention.

FIG. 10 is a graph for describing another method of motion-compensation in which an affine transform is applied to a mapping between a triangular segment in the input picture PI or in the picture frame PF in which a prediction picture is to be generated and a corresponding triangular region in the reference picture PR.

In this method, a number of affine transform parameters are calculated by comparison between a triple of coordinate pairs representing three vertices of each triangular segment in the picture frame PF and a triple of coordinate pairs representing three vertices of a corresponding triangular region in the reference picture PR.

For example, in case of a two-dimensional affine transform, six parameters "a" to "f" permit a simple expression of a correspondence between an arbitrary position (x, y) in the picture frame PF and a corresponding position (x', y') in the reference picture PR, such that:

$$\begin{pmatrix} x' \\ y' \end{pmatrix} = \begin{pmatrix} a & b \\ c & d \end{pmatrix} \cdot \begin{pmatrix} x \\ y \end{pmatrix} + \begin{pmatrix} e \\ f \end{pmatrix} \quad (8).$$

Letting $(x_1, y_1)$, $(x_2, y_2)$ and $(x_3, y_3)$ be positions of three vertices of a triangular segment in the picture frame PF, respectively, and $(x'_1, y'_1)$, $(x'_2, y'_2)$ and $(x'_3, y'_3)$ be positions of three vertices of a triangular region in the reference picture PR, respectively, it so follows that:

$$\begin{pmatrix} x_1' & x_2' & x_3' \\ y_1' & y_2' & y_3' \end{pmatrix} = \begin{pmatrix} a & b & e \\ c & d & f \end{pmatrix} \cdot \begin{pmatrix} x_1 & x_2 & x_3 \\ y_1 & y_2 & y_3 \\ 1 & 1 & 1 \end{pmatrix} \quad (9).$$

This expression can be solved as follows:

$$\begin{pmatrix} a & b & e \\ c & d & f \end{pmatrix} = \begin{pmatrix} x_1' & x_2' & x_3' \\ y_1' & y_2' & y_3' \end{pmatrix} \cdot \begin{pmatrix} x_1 & x_2 & x_3 \\ y_1 & y_2 & y_3 \\ 1 & 1 & 1 \end{pmatrix}^{-1} \quad (10).$$

The affine transform parameters thus determined are employed in the expression (8), which is used to determine each motion-compensated pixel position in a triangular region.

The affine transform parameters once given can be applied to the reference picture PR, to determine each motion-compensated pixel position in each reverse-mapped triangular region in a prediction picture.

In other words, for each concerned pixel position in the picture frame PF, there is determined a motion-compensated position, so a pixel value at this motion-compensated position of the reference picture PR is replaced to the concerned pixel position, where it constitutes a pixel value of a prediction picture.

If the reference picture PR has no pixel value at a sample point, i.e. at a motion-compensated position on a corresponding triangular region therein, a corresponding pixel value is determined by a hi-primary interpolation.

Namely, letting P(x', y') be a pixel value at a sample point (x', y'), and assuming $x_0=[x']$, $y_0=[y']$, $\alpha=x'-[x']$ and $\beta=y'-[y']$, there is performed an interpolation such that:

$$P(x',y') = (1-\alpha) \cdot (1-\beta) \cdot P(x_0,y_0) + \quad (11),$$
$$\alpha \cdot (1-\beta) \cdot P(x_0+1,y_0) +$$
$$(1-\alpha) \cdot \beta \cdot P(x_0,y_0+1) +$$
$$\alpha \cdot \beta \cdot P(x_0+1,y_0+1)$$

where [x] means a largest integer not exceeding x.

Like this, a pixel value is predicted at every pixel position in the picture frame PF, whereby a motion-compensated inter-frame prediction picture of the input picture PI is generated.

Heretofore, preferred embodiments of the present invention has been described into detail, employing a boundary line adapting principle, with respect to a system and a method for a motion-compensated inter-frame prediction in a coding of a motion picture in which a prediction is performed between a plurality of frames different in position on a temporal axis.

The principle employed in the invention may be otherwise embodied, irrespective of whether or not a motion picture is an object of the prediction.

For example, it may be applied to a multi-eye picture. In this case, information on a motion may be defined in terms of an angular parallax.

For an inter-frame prediction, a single frame of the multi-eye picture and another single frame thereof may be employed as an input picture and a reference picture, respectively.

An angular parallax of a representative point may then be detected from the reference picture, and a parallax compensation may be applied to the input picture to generate a prediction picture.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for processing in a picture frame an input picture representing a current picture and a reference picture representative of a previous picture relative to the current picture to generate a motion-compensated inter-frame prediction picture for coding of the input picture, the system comprising:

a first means for providing a set of location data representing present locations of a number of representative points in the picture frame and a set of connection data representing relationships for connecting the representative points to define boundary lines of a total number of segment regions having vertices thereof on the representative points;

a second means for detecting a contour of a moved image in the input picture to provide a set of position data representing a position of the contour;

a third means responsive to the set of location data, the set of connection data and the set of position data for correcting the present locations of the representative points to adapted locations thereof so that a number of associated segment regions have associated boundary lines thereof substantially fitted to the contour;

a fourth means for detecting first motion vectors between the input picture and the reference picture at the adapted locations of the representative points; and a fifth means for responding to the first motion vectors to interpolate therefrom second motion vectors between the input picture and the reference picture at pixels on each of the total number of the segment regions having the vertices thereof at the adapted locations of the representative points and for responding to the second motion vectors for motion-compensating the reference picture to generate the prediction picture.

2. A system for motion-compensated inter-frame prediction to be performed in coding of a motion picture in a manner in which a set of motion vectors at a plurality of representative points located in a picture frame is employed to interpolate therefrom a set of motion vectors at respective pixels in the picture frame, the system comprising:

an initial representative point allocation setting means for setting an initial allocation of the representative points to output a set of initial representative point location data and a set of representative point connection data;

a contour detecting means for analyzing an input picture to detect a contour;

a segment boundary detecting means for selecting in an initial time the set of initial representative point location data and thereafter a set of corrected representative point location data, as a set of representative point location data, referring to the set of representative point location data and the set of representative point connection data, and detecting boundary lines of segments defined by connecting the representative points, to output a set of position data of the segment boundary lines;

a segment boundary fitness evaluating means employing the set of position data of the segment boundary lines for evaluating a fitness of a respective one of the segment boundary lines to the detected contour to output an evaluated fitness data:

a representative point fitness evaluating means using the evaluated fitness data of those of the segment boundary lines connected to a respective concerned one of the representative points for evaluating a fitness of the concerned representative point to the detected contour to output an evaluated fitness data;

a representative point location correcting means using the evaluated fitness data of the representative points for correcting locations of the representative points to output corrected representative point locations, deciding if results of the correction meet a predetermined ending condition, and returning when they do not meet to an execution of the means for detecting the segment boundary lines;

a motion vector detecting means using the set of representative point connection data for detecting motion vectors between frames of the input picture and a reference picture at the corrected representative point locations; and a motion-compensated picture predicting means using the corrected representative point locations, the set of representative point connection data, the motion vectors and the reference picture to output a predicted picture.

3. A system according to claim 2, wherein the representative points are uniformly arranged in the initial allocation thereof, wherein the detected contour includes a plurality of contour lines, and wherein the system further comprises an initial representative point location correcting means for shifting those of the representative points vicinal to the contour lines so that they are each moved in advance from an initial location thereof onto a nearest one of the contour lines.

4. A system according to claim 2, further comprising a potential field setting means for setting a potential field in dependence on a distance from the detected contour, the potential field being employed for a contour fitness adaptation of pixels.

5. A system according to claim 4, wherein the potential field setting means provides the potential field in dependence on a function with a tendency responsible for a positional change to cause an increased variation in potential value, as it is at a smaller distance to the contour, and a decreased variation in potential value, as it is at a longer distance from the contour.

6. A system according to claim 2, further comprising a representative point location relative relationship evaluating means responsive to the set of representative point connection data and the set of representative point location data for evaluating relative potential energy acting in dependence on a relationship of a relative position between associated ones of the representative points, to provide an evaluated value for use in the representative point location correcting means.

7. A method for processing in a picture frame an input picture representing a current picture and a reference picture representative of a previous picture relative to the current picture to generate a motion-compensated inter-frame prediction picture for coding of the input picture, the method comprising the steps of:

providing a set of location data representing present locations of a number of representative points in the picture frame and a set of connection data representing relationships for connecting the representative points to define boundary lines of a total number of segment regions having vertices thereof on the representative points;

detecting a contour of a moved image in the input picture to provide a set of position data representing a position of the contour;

responding to the set of location data, the set of connection data and the set of position data for correcting the present locations of the representative points to adapted locations thereof so that a number of associated segment regions have associated boundary lines thereof substantially fitted to the contour;

detecting first motion vectors between the input picture and the reference picture at the adapted locations of the representative points; and responding to the first motion vectors to interpolate therefrom second motion vectors between the input picture and the reference picture at pixels on each of the total number of segment regions having the vertices thereof at the adapted locations of the representative points and for responding to the second motion vectors for motion-compensating the reference picture to generate the prediction picture.

8. A system for processing in a picture frame an input picture representing a current picture and a reference picture representative of a previous picture relative to the current picture to generate a motion-compensated inter-frame prediction picture for coding of the input picture, the system comprising:

a first device to provide a set of location data representing present locations of a number of representative points in the picture frame and a set of connection data representing relationships for connecting the representative points to define boundary lines of a total number of segment regions having vertices thereof on the representative points;

a second device to detect a contour of a moved image in the input picture to provide a set of position data representing a position of the contour;

a third device responsive to the set of location data, the set of connection data and the set of position data to correct the present locations of the representative points to adapted locations thereof so that a number of associated segment regions have associated boundary lines thereof substantially fitted to the contour;

a fourth device to detect first motion vectors between the input picture and the reference picture at the adapted locations of the representative points; and a fifth device to respond to the first motion vectors to interpolate therefrom second motion vectors between the input picture and the reference picture at pixels on each of the total number of the segment regions having the vertices thereof at the adapted locations of the representative points and for responding to the second motion vectors for motion-compensating the reference picture to generate the prediction picture.

9. A system for a motion-compensated inter-frame prediction to be performed in coding of a motion picture in a manner in which a set of motion vectors at a plurality of representative points located in a picture frame is employed to interpolate therefrom a set of motion vectors at respective pixels in the picture frame, the system comprising:

an initial representative point allocation setting device to set up an initial allocation of the representative points to output a set of initial representative point location data and a set of representative point connection data;

a contour detecting device to analyze an input picture to detect a contour;

a segment boundary detecting device to select in an initial time the set of initial representative point location data and thereafter a set of corrected representative point location data, as a set of representative point location data, to refer to the set of representative point location data and the set of representative point connection data, and to detect boundary lines of segments defined by connecting the representative points, to output a set of position data of the segment boundary lines;

a segment boundary fitness evaluating device employing the set of position data of the segment boundary lines to evaluate a fitness of a respective one of the segment boundary lines to the detected contour to output an evaluated fitness data;

a representative point fitness evaluating device using the evaluated fitness data of those of the segment boundary lines connected to a respective concerned one of the representative points to evaluate a fitness of the concerned representative point to the detected contour to output an evaluated fitness data;

a representative point location correcting device using the evaluated fitness data of the representative points to correct locations of the representative points to output corrected representative point locations, to decode it results of the correction meet a predetermined ending condition, and to return when they do not meet to an execution of the device to detect the segment boundary lines;

a motion vector detecting device using the set of representative point connection data to detect motion vectors between frames of the input picture and a reference picture at the corrected representative point locations; and a motion-compensated picture predicting device using the corrected representative point locations, the set of representative point connection data, the motion vectors and the reference picture to output a predicted picture.

* * * * *